United States Patent
McHugh

[15] 3,651,387
[45] Mar. 21, 1972

[54] STACKED MICA CAPACITORS
[72] Inventor: James Francis McHugh, Oak Bluffs, Mass.
[73] Assignee: Cornell-Dubilier Electric Corporation, Newark, N.J.
[22] Filed: Mar. 18, 1971
[21] Appl. No.: 125,729

[52] U.S. Cl. ............................................. 317/258, 317/261
[51] Int. Cl. ..................................... H01g 1/01, H01g 1/14
[58] Field of Search ........................................... 317/258, 261

[56] References Cited

UNITED STATES PATENTS

| | | | |
|---|---|---|---|
| 1,334,142 | 3/1920 | Dublier | 317/261 |
| 3,229,173 | 1/1966 | McHugh | 317/258 |

Primary Examiner—E. A. Goldberg
Attorney—Paul S. Martin

[57] ABSTRACT

A capacitor capable of resisting extremely high inertial stresses consists of interconnected capacitor sections. Each capacitor section includes a stack of synthetic mica sheets alternating with aluminum foils serving as electrodes, plus outermost terminal electrodes. The latter are formed of copper foils sandwiched between much thinner and softer aluminum foils. The electrode foils and the terminal electrodes are recessed alternately from opposite ends of the stack in marginal areas and extend respectively outside the opposite ends of the stack and are doubled back over the outer surfaces of the stack in the respective recessed marginal areas. The stack is flattened and is unified by a solidified silicone-resin impregnant. The doubled-back copper foils provide solderable connection areas.

10 Claims, 3 Drawing Figures

STACKED MICA CAPACITORS

The present invention relates to stacked capacitors, especially to such capacitors using synthetic mica dielectric sheets impregnated and solidified by a dielectric resin.

Capacitor sections made of stacked electrode foils and synthetic mica sheets alternating with the electrode foils are commonly unified by subjecting the stack to heat and pressure, thereby polymerizing a B-stage resin impregnant in the synthetic mica sheets. Aluminum foil is used as the thin electrodes needed for obtaining the desired capacitance without excessive thickness. The aluminum is soft and thin, and therefore the cut edges of the foils have little tendency to dig into the mica sheets. The aluminum is well suited to withstand high temperatures needed for polymerizing the preferred resin impregnant.

There has been a problem of making terminal connections to the aluminum foil electrodes. Nickel foil overlay tabs for the electrode foils have been used. That approach creates important localized deviations in the overall thickness of the stack. Due to that construction, the desirable high processing pressures are not built up in areas where there are no terminal tabs, and as a consequence, less capacitance is realized than that which would be obtained with uniformly high pressure over the whole electrode area. Utilizing aluminum electrode foils extending laterally outside the stack of dielectric sheets for terminal connection has been proposed. However, projecting foils are to some extent integrated by the B-stage impregnant that flows out of the dielectric under heat and pressure and then the exuded impregnant solidifies between portions of the extended foils. The remainder of the projecting foils is fragile and it is of aluminum. For both these reasons it is difficult to make consistent and dependable terminal connection to extended foils in these capacitors. Still further, where the capacitors are to be used in extremely high-G applications (as on a high-speed large-diameter rotor) terminal connections to extended foils create special problems.

An object of the invention resides in providing a novel construction for capacitor sections aimed at overcoming the foregoing difficulties, separately and collectively.

In the illustrative embodiment of the invention described in detail below and shown in the accompanying drawings, synthetic mica sheets are stacked in alternation with thin aluminum foil electrodes. One series of foils is recessed along one marginal area of the stack and projects from the opposite edge of the stack, and a second series of foils that alternate with the foils of the first series is reversely arranged, projecting at the recessed-area end of the first series and recessed at the side of the stack where the first series of electrode foils projects. Two terminal foils that are much thicker than the two series of electrode foils are introduced at the top and bottom of the stack, with a cover sheet of dielectric. The projecting electrode foils and the terminal foil at each end of the stack are bent around the end of the stack and are doubled back over the marginal area defined by the recessing of the other electrode foils. When the structure is pressed flat and heated for polymerizing the resin impregnant, the doubled-back foils plus the rest of the end structure in the stack become coplanar with the surfaces of the stack in the area of the stack between the marginal areas.

The terminal foils are ideally of copper, a metal that is easily soldered without resort to corrosive fluxes. Further, copper is available at low cost as a thin foil, much thicker than the aluminum electrode foil but relatively thin compared with foils of other metals that might be substituted. The copper foil tends to oxidize completely during the heated polymerzation treatment. To guard against such oxidation, the copper foil is sandwiched between two thin aluminum foils, the same as is used for the electrode foils. The external bent-back marginal part of the copper in the sandwiched foils is easily bared of the aluminum in preparation for making a soft-solder terminal connection.

Other foils such as nickel might be used as a terminal foil. Even then it is desirable to include an aluminum foil as a cover for the side of the terminal foil that faces the next electrode in the stack. This guards against protruding cut formations at the edges of the comparatively thick and hard terminal foil digging into the dielectric separator. The aluminum foil is thin and it is very soft or ductile, and it has virtually no tendency of retaining any sharp edge projections when it is subjected to high pressures imposed on the stack during the polymerization treatment. The added aluminum foil that covers the terminal foil minimizes the possibility of high localized mechanical and electrical stresses developing in the dielectric layer facing the terminal foils.

The nature of the invention including the further advantages and novel features will be better appreciated from the following detailed description of the presently preferred illustrative embodiment of the invention shown in the accompanying drawings.

Figure 2:
FIG. 2 is a somewhat diagrammatic edge or side view of the novel stack of dielectric, electrode and terminal layers of the capacitor section of FIG. 1, drawn to larger scale than FIG. 1, the projecting foils of FIG. 1 being doubled back over marginal areas of the section.
Figure 1:
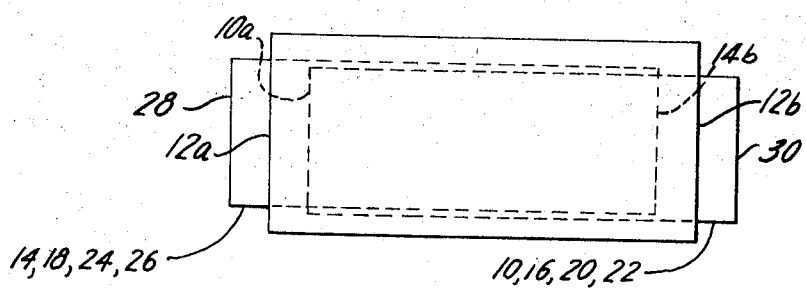
FIG. 1 is a top plan view of an assembly of electrode foils, terminal foils and dielectric layers, drawn to reduced scale, at the completion of a stack used in making the illustrative capacitor sections.

Referring now to the drawings, a series of electrode foils 10, sheets 12 of synthetic mica, and electrode foils 14 are stacked as shown in FIGS. 1 and 2, together with terminal foils 16 and 18 sandwiched between protective foils 20 and 22, and 24 and 26, respectively. In an example, terminal foils of copper are 0.001 inch thick and foils 10, 14, 20, 22, 24 and 26 of aluminum are 0.00025 inch thick. The copper foil is not springy, nor is the much thinner aluminum foil. The left-hand edges 10a of foils 10 are recessed and leave a margined area at the left end of the capacitor section between the ends 12a of the mica sheets and the edges 10a and 12a. At the right end of the section, there is a margined area between the edges 14b of the electrodes and edges 12b of the synthetic mica sheets. Terminal foil 18 and its covering foils 24 and 26 are aligned with each other and with the edges of electrode foils 14, continuing the margined area effect at the right end (as shown) of the stacked capacitor section. Likewise, terminal foil 16 and its protective foils 20 and 22 are aligned at their edges and with the edges of electrode foils 10, thus continuing the margined area left by the recessed edges 10a and 12a. A practical example of the stack illustrated has a total of 60 sheets of mica forming double-sheet dielectrics and 31 foils (considering the terminal foil sandwiches as single foils in this count) separated by such double-sheet dielectrics, plus two cover sheets of mica at the top of the stack and two more sheets at the bottom.

The assembled stack of flat dielectric sheets and flat foils appears as in FIG. 1, with certain of the foils recessed at the right-hand end of the stack and other foils recessed at the left-hand end. The foils are all of the same length, equal to that of the mica sheets so that any foil that is recessed at one end of the stack has equally projecting ends 28 and 30 at the opposite end of the stack, respectively. After being assembled flat, the projecting portions of the foils are wrapped about the ends of the stack toward the respective broad faces of the stack that are remote from the corresponding terminal foils. Thus, terminal foil 16 that is largely at the bottom of the stack has its projecting portion wrapped around the right-hand end of the stack and across the top of the stack. The extended foils at the right end are all bent together and overlie the right-hand marginal area between recessed electrode edges 14b and edges 12b of the mica sheets and form a terminal 32. Correspondingly, the projecting foils at edges 28 (FIG. 1) including the projecting part of terminal foil 18 which is above all the electrode foils 10 and 14 is bent down and doubled over the bottom of the stack and forms a terminal 34. There the doubled-back foils occupy very nearly the marginal area defined by recessed edges 10a in relation to mica sheet edges 12a. As a result, the thickness of the stack is the same everywhere, neglecting the slight gap that tends to develop between a vertical projection of the edges of the electrode foils and the edges of the bent-back foils at each end of the stack. This also disregards the longitudinal margins of all the electrodes and terminal foils that are recessed from the longitudinal edges of the mica sheets. In FIG. 1 the longitudinal edges of the two sets of foils are shown misaligned for clarity of illustration, but in practice the longitudinal edges of all the foils are aligned.

The synthetic mica sheets or "paper" is impregnated with a silicone resin in its B stage as it is supplied. "Isomica" supplied by 3M Company is an example. The stack is subjected to enormous pressure at 570° C. for 24 hours between flat pressure plates protected by a release agent. The B-stage impregnant tends to ooze out at the edges before it sets, and thereafter it solidifies and unifies the capacitor section. The bent-back areas of foil are united with the rest of the unit by flowed impregnant, but this does not interfere with the connection of the foils to each other in the bent-back region.

During the heat treatment, the copper terminal foils are protected from destruction by oxidation by the protective foils on the top and bottom of those terminal foils. Protective foils 22 and 26 serve a further purpose. These foils are disposed between the respective terminal electrodes 16 and 18 and the opposed electrode foils 14 and 10. Because foils 10 and 14 are of dead-soft aluminum and are so thin, any sharp localized edge irregularities of the foil that might tend to bear against the mica dielectric separator is flattened in the pressure treatment. Foils 22 and 26 protect the dielectric separator from any similar edge irregularities that tend to occur on the terminal foil. Such edge irregularities of the terminal foils might survive the pressure of the treatment. But for the protective foils (or an extra thickness of dielectric separator) the irregularities of the terminal foils may be expected to develop mechanical and electrical stress concentrations, this effect leading potentially to premature failure.

Following the heat-and-pressure treatment, the externally exposed portions of the protective foils 20 and 24 which cover the bent-back parts of the terminal foils are readily removed by brushing, leaving clean and readily solderable terminals 32' and 34' for the capacitor section. The capacitor sections are assembled in various configurations, and thin terminals are connected by soldering, in various series, parallel and series-parallel configurations.

Figure 3:
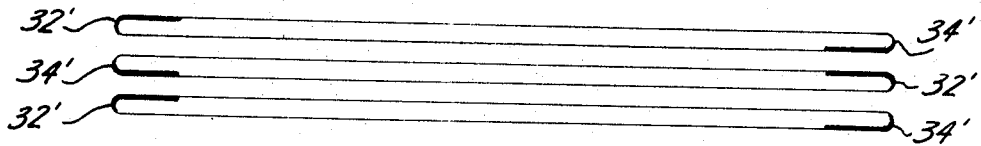
FIG. 3 is a diagrammatic edge or side view of a few capacitor sections such as those prepared as in FIG. 1, in readiness for stacked assembly into a larger capacitor.

FIG. 3 diagrammatically illustrates a few completed capacitor sections 36 assembled for series connection. Before such assembly, it may be advantageous to tin the cleaned terminals 32' and 34' with a solder coating, so that connection of the whole assembly can be carried out by heating the assembly of capacitor sections. They lie flat against one another and can be united and given support as required against mechanical stresses. The coplanar relationship of the major areas of the electrodes and the marginal areas at the ends of the capacitor sections is important in this respect. In an application of such capacitors in a large-diameter rotor operated at high speed, the capacitor is required by the user to withstand acceleration forces of 9000G's.

The flatness of the assembled unit at the time of the heat-and-pressure treatment contributes importantly to full utilization of the materials, in attaining maximum capacitance. In other forms of construction there are isolated extra thicknesses such as those resulting from built-up overlays of foil terminals against electrode foils. The resulting localized extra thicknesses in that construction prevents application of the desired processing pressure to the areas occupied only by electrode foils and dielectric layers. The pressure of such localized extra thicknesses results in an apparently lower dielectric constant, and in a reduction of the capacitance, as compared with the values obtainable here. Where the whole electrode area of the capacitor stack can be subjected to uniform high treatment pressures everywhere, a markedly higher dielectric constant is attained in the finished capacitor. This effect is explained partly by the fact that the thickness of the stack is reduced by 20 percent during the pressure treatment when some of the B-stage impregnant oozes out of the stack. As already explained, the total stack thickness in the region of the bent-back terminals where the electrode foils are recessed is equal to (not greater than) the thickness of the stack over the capacitor-section area between the bent-back terminals.

In the illustrated capacitor section, there is no electrode foil above the terminal foil sandwich 26–18–24, but there is one electrode foil 14 below terminal foil sandwich 20–16–22. This configuration results in the capacitor section having the same electrostatic potential top and bottom. Of course this is true of all other like capacitor sections so that variations in the spacing between each capacitor section and confronting sections would have no effect on the capacitance of the assembled sections. Despite this, the placement of the terminal foil sandwiches as shown results in the bent-over portions 32 and 34 of all electrode foils 10 and 14 being protected and covered by bent-over portions of the terminal foil sandwiches. Consequently the baring of bent-over terminal portions of foils 16 and 18 by scraping away the covering portions of foils 20 and 24 (to expose terminal portions of foils 16 and 18 to be tinned as explained above) does not interfere with secure integration of the bent-over portions of the electrode foils 10 and 14 into the bent-over terminals of the completed section. No bent-over portions of any foil 10 or 14 is exposed or scraped away in making terminal connections to the completed capacitor section.

The foregoing description of the illustrative embodiment of the invention represents the exemplary construction, but it will of course be subject to modification and varied application by those skilled in the art. Consequently, the invention should be construed broadly in accordance with its full spirit and scope.

I claim:

1. A stacked capacitor section including
   a. a stack of dielectric separators having first and second aligned ends,
   b. a series of aluminum foils forming electrode layers, said foils being interposed between successive ones of said dielectric separators, said foils having respective ends recessed alternately from said first and second aligned ends of the stack thus defining a pair of recessed margins, the ends of said foils opposite the recessed ends thereof projecting from the opposite ends of the stack and being doubled back against the exterior of the stack so as to overlie said recessed margins, and
   c. a pair of terminal foils substantially thicker than said aluminum foils extending completely into the stack from opposite ends thereof and being doubled back against said doubled-back ends of said aluminum foils, respectively, said capacitor section being compacted and essentially flat at the opposite lateral surfaces thereof and being impregnated with and unified by a solidified polymeric dielectric.

2. A capacitor section in accordance with claim 1, wherein each of said terminal foils is a copper foil and is sandwiched between a pair of protective aluminum foils.

3. A capacitor section in accordance with claim 1, wherein each of said terminal foils is a copper foil and is sandwiched between a pair of protective aluminum foils and wherein the external surface of the doubled-back portions of said copper foils overlying said recessed margins are free of aluminum foil.

4. A capacitor section in accordance with claim 1, wherein each of said terminal foils is a copper foil and is sandwiched between a pair of protective aluminum foils, and wherein the copper foil and said protective aluminum foils are substantially coextensive with said series of aluminum foils forming said electrode layers.

5. A capacitor section in accordance with claim 1, wherein each of said terminal foils is copper and has an antioxidant covering thereon except at the external surface of the double-back portion thereof that overlies said recessed margins.

6. A capacitor section in accordance with claim 1, wherein said dielectric layers are sheets of synthetic mica impregnated with silicone resin.

7. A capacitor section in accordance with claim 6, wherein each of said terminal foils is a copper foil and is sandwiched between a pair of protective aluminum foils.

8. A stacked capacitor section in accordance with claim 1, wherein each said terminal foil is a substantially harder metal than aluminum foil and each surface of said terminal foils facing the aforesaid stacked alternating dielectric separators and aluminum electrode foils is covered by a protective aluminum foil.

9. A capacitor section in accordance with claim 1, wherein said terminal foils are substantially coextensive with said aluminum electrode foils in the stack, and wherein each of the double-back portions of the electrode foils underlies and is united to a bent over portion on one of said terminal foils.

10. A stacked capacitor section in accordance with claim 9, wherein each said terminal foil is copper and wherein each surface thereof is covered at least within the stack by a protective aluminum foil.

* * * * *